UNITED STATES PATENT OFFICE.

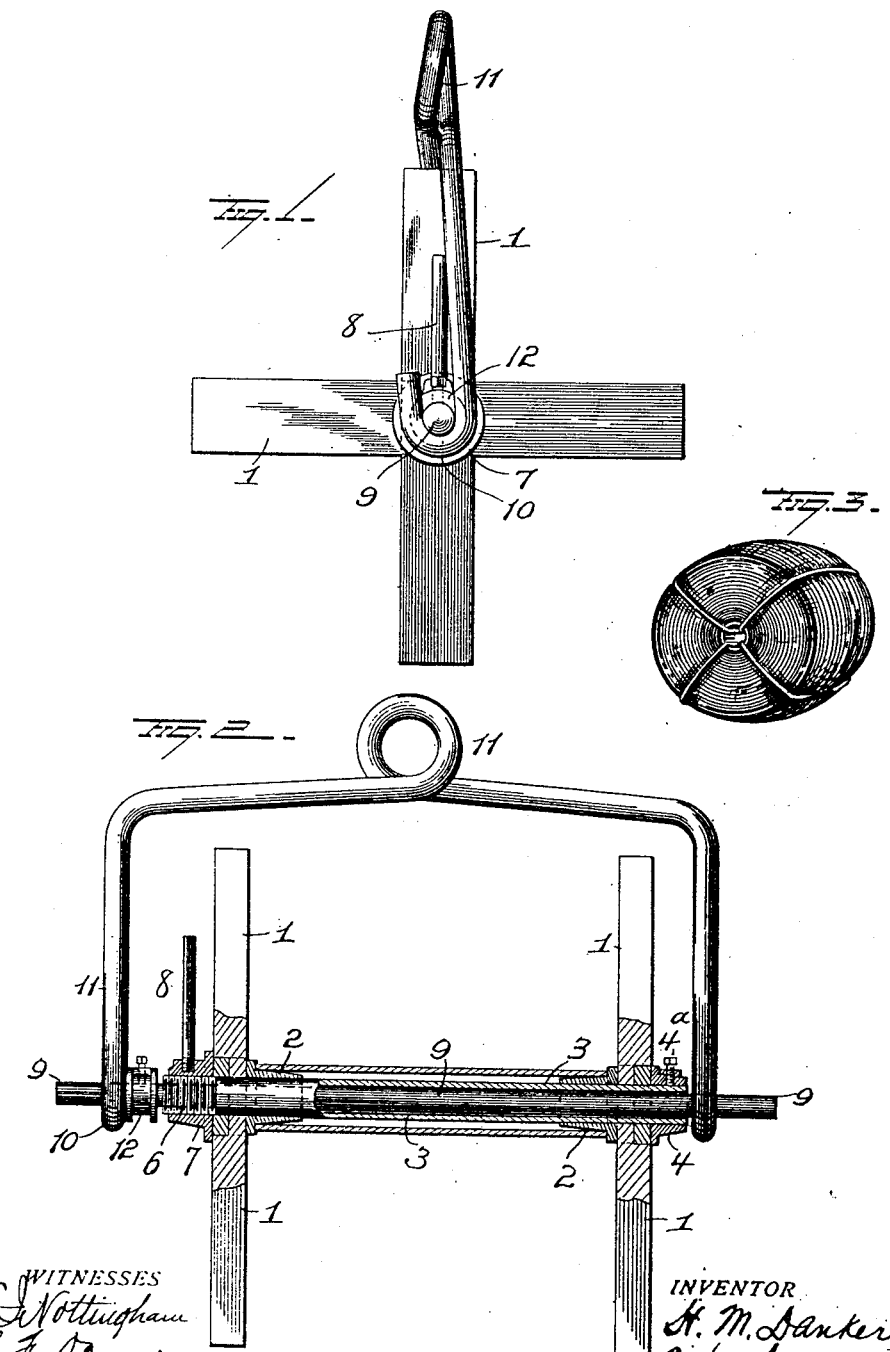

HUGO M. DANKER, OF AUSTIN, ILLINOIS.

CORD OR TWINE HOLDER.

No. 874,168.  Specification of Letters Patent.  Patented Dec. 17, 1907.

Application filed March 20, 1907. Serial No. 363,429.

*To all whom it may concern:*

Be it known that I, HUGO M. DANKER, of Austin, in the county of Cook and State of Illinois, have invented certain new and useful Improvements in Cord or Twine Holders; and I do hereby declare the following to be a full, clear, and exact description of the invention, such as will enable others skilled in the art to which it appertains to make and use the same.

My invention relates to an improvement in cord or twine holders.

It is the ordinary practice to put up cord or twine in bulk on reels, the filled reels weighing from ten to sixty pounds and selling at from about nine to twenty four cents a pound on the reel. The wood reels weigh from two to five pounds according to the size of the reel, consequently with every reel, the buyer loses a sum equal to the weight of the reel multiplied by the price per pound of the cord or twine.

The object of my invention is to dispense with the permanent wooden reels on which the cord or twine is ordinarily wound, and provide a holder made of detachable sections adapted to receive balls of cord or twine wound on paper tubes, or cores the cord or twine being held in place and position on the core, and before its placement on the holder, by binding cords.

With this object in view my invention consists in a reel having the peculiar characteristics that will be more fully described and pointed out in the claims.

In the accompanying drawings, Figure 1 is a view in side elevation of a reel embodying my invention. Fig. 2 is a view in section of same, and Fig. 3 is a view of a ball of cord or twine adapted to be used on said reel.

Each side member 1 of the reel is made of wooden bars crossed in the form of an X, and secured together in any suitable manner, and each side member is provided on its inner face with a hollow tapering thimble 2, the latter being secured to the side member by screws or nails. Passing through the members 1 and through the thimbles, is a hollow shaft 3, provided at one end outside its adjacent side member 1 with a collar 4 secured thereto by set screws 4ª and provided at its opposite end outside of its adjacent side member with screw threads 6 to receive the threaded lock nut 7 the latter being provided with a handle 8 by which it can be conveniently turned. Passing through the hollow shaft 3 is the rod 9 the ends of which rest in the hooks 10 of the spring bail 11, a collar 12 being secured thereto between one hook 9 and adjacent end of the hollow shaft 3, so as to prevent its longitudinal displacement when the reel is suspended from its bail.

By loosening up the set screw securing the collar 12 in place, withdrawing rod 9 from the reel, and then removing lock nut 7 from hollow shaft 3, the parts may be separated for the insertion of a spool or ball of cord or twine shown in Fig. 3.

The spools or balls shown in Fig. 3 are formed by winding the cord or twine on a paper tube, and securing the balled cord or twine in its proper position by binding cords passing through the center of the ball and tied at their ends. The ball so formed is passed over the thimble 2 on one side 1 of the holder, the paper tube on core within the ball firmly engaging the tapering surface of the thimble. The hollow shaft 3 may be passed through thimble 2 before the ball of cord or twine is placed on thimble 2, or after it has been so placed, as desired. The remaining side member 1 is then adjusted on the hollow shaft with its thimble entering the hollow paper spool, and the parts are secured in place with the ball supported on the two thimbles 2, by screwing the nut 7 onto the screw threaded end of hollow shaft 3. By now applying the hooked ends 10 of bail 11 to the projecting ends of rod 11, which as previously explained is passed through hollow shaft 3, and locking collar 12 in place between one hook of the bail and the adjacent side of the holder, the parts will be locked against displacement.

The reel or holder thus formed is solid and substantial in construction and may be quickly and readily taken apart and assembled.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. In a holder for a ball of cord or twine, the combination with side members and a hollow thimble projecting inwardly from each side member, of a hollow shaft passing through both side members and said thimbles, locking devices secured to said shaft outside of the side members and engaging the latter, a rod passing through the hollow shaft, and a bail engaging the rod outside of said locking devices.

2. In a holder for a ball of cord or twine, the combination of side members each having an inwardly projecting hollow thimble, a hollow shaft passing loosely through said side members and thimble, locking devices secured to said shaft outside the side members, a rod passing through the hollow shaft, a bail engaging the rods near the ends of the latter and a collar secured to the rod between one end of the bail and adjacent side member of the holder.

In testimony whereof, I have signed this specification in the presence of two subcribing witnesses.

HUGO M. DANKER.

Witnesses:
FRANK MARTENS,
LEOPOLD TOMANY.